Nov. 28, 1967

F. E. ERICKSON 3,355,602

CLUTCH MECHANISM

Filed Feb. 27, 1967

INVENTOR.
FREDERICK E. ERICKSON

BY Meyer, Tilberry & Body

ATTORNEYS

Nov. 28, 1967     F. E. ERICKSON     3,355,602
CLUTCH MECHANISM
Filed Feb. 27, 1967     2 Sheets-Sheet 2
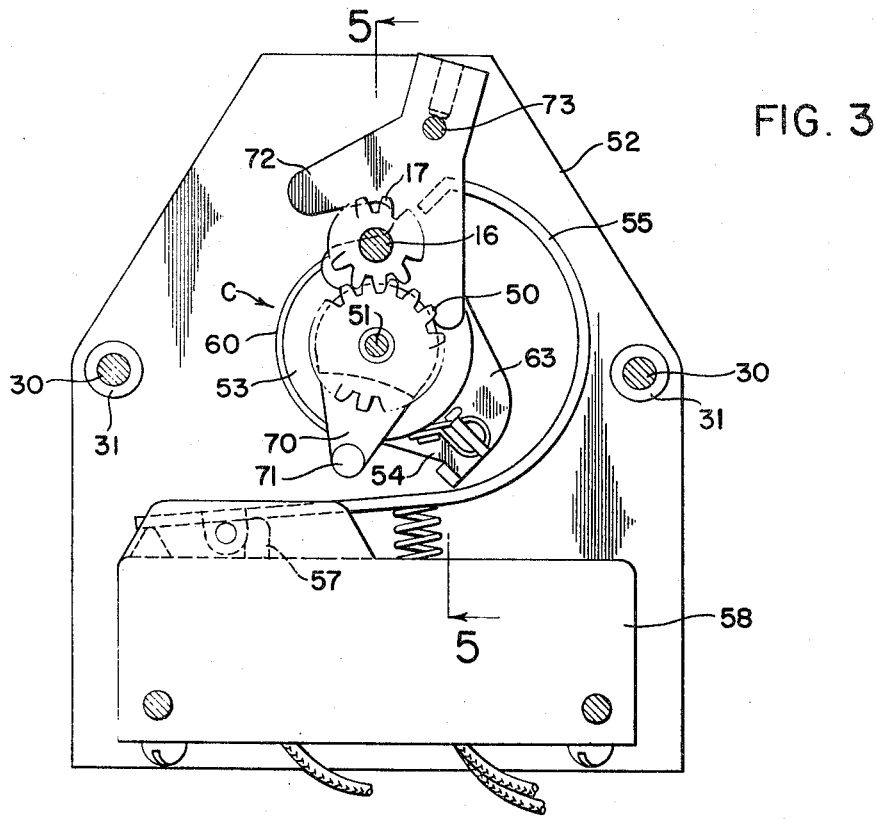
FIG. 3
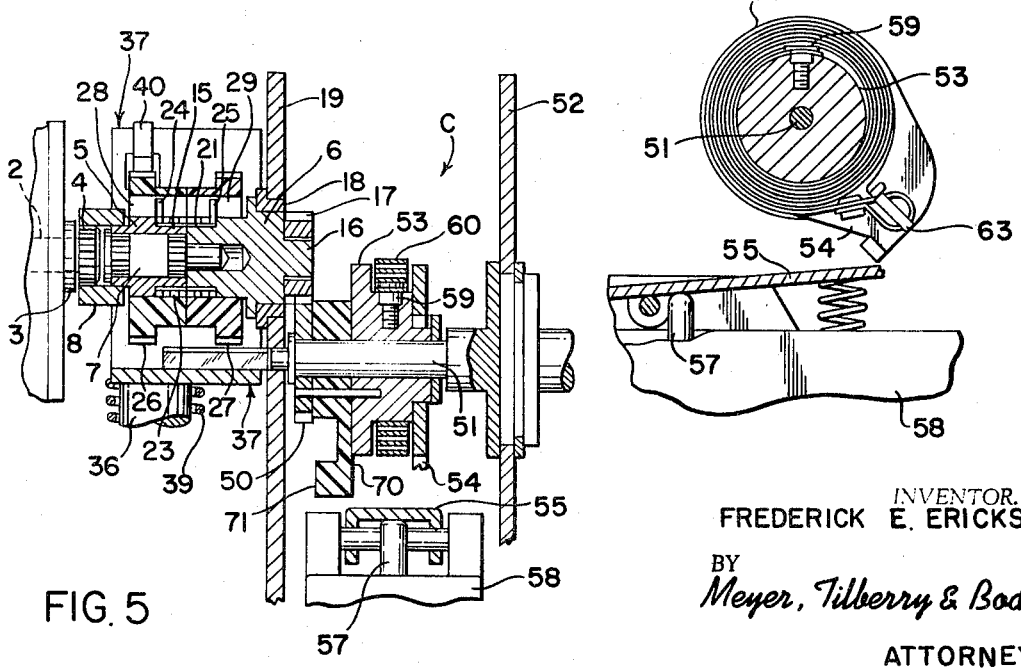
FIG. 4
FIG. 5
INVENTOR.
FREDERICK E. ERICKSON
BY
Meyer, Tilberry & Body
ATTORNEYS United States Patent Office 3,355,602
Patented Nov. 28, 1967

3,355,602
CLUTCH MECHANISM
Frederick Edwin Erickson, Port Byron, Ill., assignor to
E. W. Bliss Company, Canton, Ohio, a corporation of
Delaware
Filed Feb. 27, 1967, Ser. No. 618,781
15 Claims. (Cl. 307—141.4)

ABSTRACT OF THE DISCLOSURE

A spring clutch mechanism having rotating input and output drums, and a coiled spring which coaxially surrounds and grips both drums during clutch engagement. A clutch release mechanism serves to release the coiled spring from its grip on the input drum. An actuating mechanism serves, after a given angular rotation of the driven drum, to actuate the clutch release mechanism so that the input drum continues to rotate without transmitting rotational forces to the output drum.

---

This is a continuation-in-part of my copending application entitled, "Solenoid Operated Clutch Mechanism," Ser. No. 506,940, filed Nov. 9, 1965, and assigned to the same assignee as the present invention.

This invention relates to the art of clutches and, more particularly, to an improved spring clutch release mechanism.

The invention is particularly applicable for use in conjunction with a reset timer and will be described with particular reference thereto; although, it will be appreciated that the invention may be used in various applications requiring clutch release mechanisms.

Reset timers known in the prior art, such as that illustrated in the patent to Hagen 2,946,902, generally use a clutch-type synchronous electric motor unit in which a clutch is located between the rotor shaft and the motor reduction gears. Consequently, in order to reset the timer at the completion of a timing cycle, it is necessary to reverse not only the timing mechanism but also the entire motor reduction gear train. Accordingly, relatively strong springs, or other means, must be used to reverse the mechanism due to the considerable inertia and mechanical friction in the gear train which must be overcome. Also, such an arrangement limits the time ranges of timers, since the greater the reduction factor in the motor unit and timing mechanism, the greater the force required to reset the timer and, hence, the longer will be the reset time. Time ranges from five to ten minutes are usually considered maximum for clutch-type synchronous motor operated timers having a reset capability.

The reset time could be substantially decreased if a reset timer be driven with a synchronous motor having integral reduction gears but having no integral clutch. With this arrangement, an independent clutch would be required to couple the motor to a timing and reset mechanism, so that when the timing cycle is completed the clutch may be released to reset the timing mechanism without reversing the reduction gears in the motor unit.

The present invention is directed toward an improved spring clutch having a release mechanism so that the structure is particularly applicable for use in conjunction with a reset timer having a motor unit which does not include an integral clutch. Instead, an external clutch, similar to the spring-type in my application, Ser. No. 506,940, the disclosure of which is incorporated herein by reference, is used.

In accordance with the invention, the clutch mechanism comprises a driven member and a driving member for driving the driven member in a given direction about a common axis of rotation; a coiled spring having opposite end portions wrapped about facing end portions of the two members and resiliently biased to firmly grip the members during rotation in the given direction to transmit rotational forces from the driving member to the driven member; clutch release means for, upon actuation, preventing rotation of the driving end portion of the spring in the given direction and thereby unwind the driving end portion of the spring so that rotational forces are not transmitted to the driven member; and, actuating means for actuating the clutch release means and including a stop engaging member coupled to and rotationally driven about its axis of rotation by the driven member, and a movably mounted stop for actuating the clutch release means and having a portion thereof located in the path of rotational movement of the stop engaging member so as to be engaged and moved thereby.

In accordance with a more limited aspect of the present invention, means are provided for resetting the driven member to its original position following actuation of the clutch release means.

In accordance with a still further aspect of the invention, a switch actuator is driven by the driven member for purposes of actuating a switch upon a predetermined angular rotation of the driven member so that the switch may be actuated while the driving member continues to rotate in the given direction.

The primary object of the present invention is to provide an improved clutch particularly applicable for use with a reset timer so that the timer is capable of being reset after completing its timing cycle without having to reverse the reduction gears of its drive motor.

It is a still further object of the invention to provide a clutch mechanism for use with a reset timer so that the timer may actuate a switch without de-energizing the motor for driving the timer.

It is a still further object of the present invention to provide a clutch mechanism for a reset timer permitting the timer to have a quick reset time, as well as longer timing cycles than known heretofore.

A still further object of the present invention is to provide a clutch mechanism which is relatively inexpensive to manufacture and which is particularly applicable for use in conjunction with a reset timer.

The foregoing and other objects and advantages of the invention will become more readily apparent from the following description of the preferred embodiment of the invention as read in connection with the accompanying drawings in which:

FIGURE 3 is a sectional view taken on the line 3—3 of FIGURE 1;

FIGURE 4 is a fragmentary cross-sectional view showing a switch actuator and a switch taken on line 4—4 of FIGURE 1; and FIGURE 5 is a cross-sectional view taken on the line 5—5 of FIGURE 3.

Figures 1, 2:
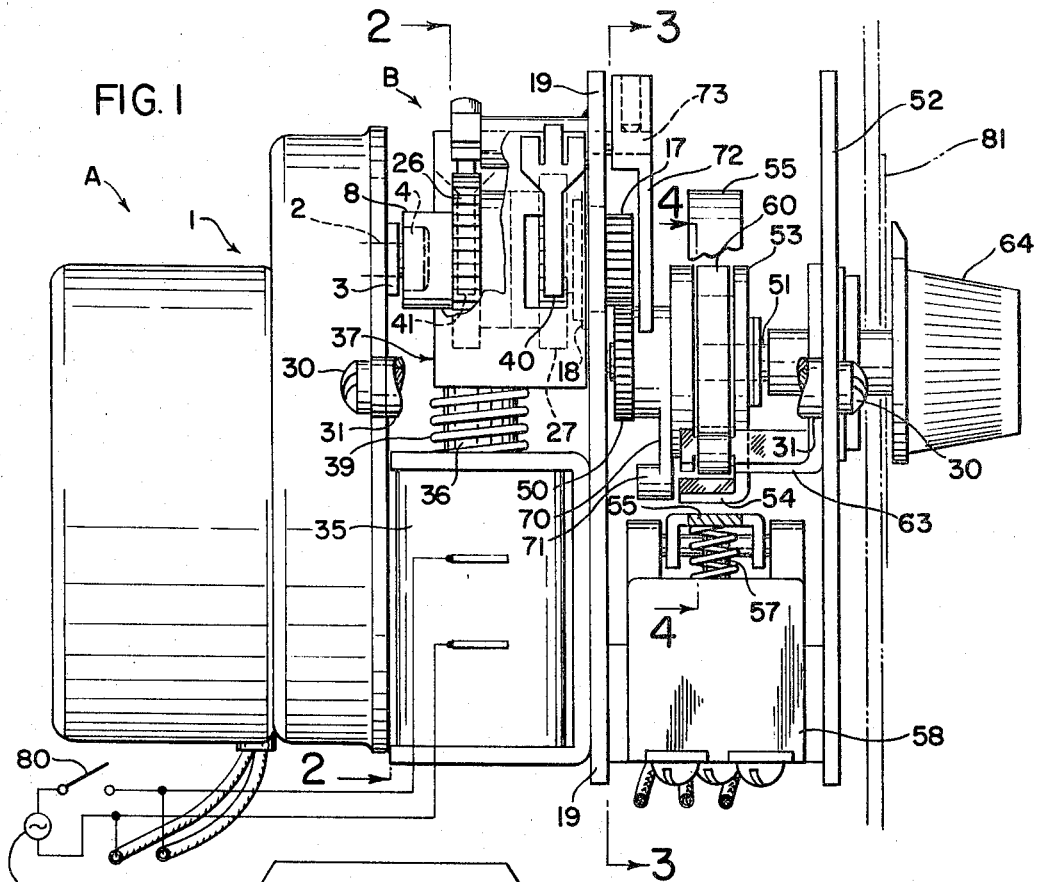
FIGURE 1 is an elevational view of a reset timer embodying the invention.
FIGURE 2 is a sectional view taken on the line 2—2 of FIGURE 1.

Referring more particularly to the drawings, there is shown a reset timer which illustrates an application of the preferred embodiment of the invention and which includes a synchronous electric motor unit A, a clutch assembly B and a timing and reset mechanism C.

*Motor unit and clutch assembly*

The motor unit A includes a synchronous motor 1 having integral reduction gears but no integral clutch. Motor 1 has an output drive shaft 2 journaled in a bearing 3 and having an output pinion 4.

Clutch assembly B includes an input drum 5 and an output drum 6 coaxially surrounding a pin 7, which serves to hold the assembly together. Drum 5 is free floating on pin 7 and drum 6 is press fit to pin 7. Drive pinion 4 of motor unit A is coupled to assembly B by a sleeve 8, which coaxially surrounds the left end of drum 5 and pinion 4. Sleeve 8 is secured to drum 5 and pinion 4 as by a press fit or broached teeth.

Located coaxially of the motor drive pinion 4 is a shaft 16 extending axially from drum 6, and which carries a clutch output pinion 17 adapted to drive the timing and reset mechanism C. Drum 6 is journaled in a bearing 18 mounted in a bracket 19, which is connected to motor 1 by means of machine screws 30 and spacers 31.

Input and output drums 5 and 6 include adjacent, facing, cylindrical drum portions 15 and 21, respectively. Circumlocated about the drum portions 15 and 21 is a coil spring 23 formed of rectangular stock and having its helices closely adjacent one another. The inner diameter of the coil spring 23, in its normal unstressed condition, is slightly smaller than the outer diameter of the drum portions 15 and 21 so that the spring is normally biased to grip both drums 5 and 6 to provide clutch engagement.

The ends 24 and 25 of spring 23 project radially outward, as best shown in FIGURES 2 and 5, and by turning these ends in opposing directions, the spring unwinds as its helices are radially expanded to a diameter larger than that of the drum portions 15 and 21 to release the clutch.

Concentrically disposed around the coil spring 23 are two ratchet wheels 26 and 27 which may be turned relative to the spring 23 and relative to each other. Ratchet wheel 26 has a radial slot 28 formed therein for receiving end 24 of spring 23, and wheel 27 has a radial slot 29 formed therein for receiving the other end 25. Accordingly, when the ratchet wheels 26 and 27 are turned in opposite directions, in a manner tending to unwind the spring 23, the helices expand radially and the clutch disengages.

Attached to the bracket 19, as best shown in FIGURES 1 and 2, is a solenoid 35 having a plunger 36. Plunger 36 operates a U-formed bracket 37 which is biased to the condition shown in FIGURE 2 by means of a compression spring 39. Mounted on U-formed bracket 37 are projecting arms 40 and 41, formed of thin resilient metal, each of which is adapted to engage the teeth on the periphery of one of the ratchet wheels 26 or 27, the arm 40 being engageable with the teeth of wheel 26 and the arm 41 being engageable with the teeth of wheel 27. Accordingly, linear movement of the plunger 36 in an upward direction, as viewed in FIGURE 2, urges arms 40 and 41 into engagement with wheels 26 and 27 to turn the wheels in opposite directions, and thereby radially expand spring 23 to release the clutch.

As shown in FIGURE 1, solenoid 35 and motor 1 are coupled together electrically by a switch 80 on an alternating current voltage source V, so that the clutch is disengaged and the motor is deenergized when the switch is opened. Upon closure of switch 80, plunger 36 is retracted so that arms 40 and 41 disengage from wheels 26 and 27 to permit the clutch to be engaged.

*Timing and reset mechanism*

Referring now to the timing and reset mechanism C, best shown in FIGURES 3, 4 and 5, the clutch output pinion 17 meshes with a timing gear 50 rigidly attached to a carrier member 53 which is rotatably mounted on a shaft 51 journaled at one end in the bracket 19 and at the other end in a bracket 52. Member 53 also carries a switch actuator arm 54 which is engageable with a free end of switch lever 55 pivotally mounted at its other end on switch 58. Switch lever 55 pivots, when its free end is engaged by actuator arm 54, so as to depress a plunger 57 which actuates switch 58. Thus, after the timing gear 50 has rotated through a predetermined arc, switch arm 54 pivots the switch lever 55 to actuate switch 58.

Mounted on carrier member 53 is a spiral spring 60 which serves to resiliently bias the timing gear 50 in a direction tending to reverse the timing and reset mechanism back to its initial position. The inner end of the spring 60 is secured to the carrier member 53 by set screw 59 and, accordingly, the inner end of the spring rotates with member 53. The outer end of the spring 60 is mounted to an angle bracket 63 attached to shaft 51. Thus rotation of the timing gear 50 serves to wind spring 60 as carrier member 53 turns in a clockwise direction, as viewed in FIGURE 4. When the clutch is released, spring 60 will turn the carrier member 53, together with the timing gear 50 and clutch output shaft 16, in a counterclockwise direction to displace the timing and reset mechanism C to its initial starting position. Timing gear 50 may be initially adjusted for a variable timing cycle duration by means of calibrated dial 81 and a control knob 64, mounted on the shaft 51. The degrees of arc through which the timing gear and switch actuator arm 54 must turn before the switch 58 will be actuated determine the timed interval.

A radially extending arm 70 is mounted on the carrier member 53 and has an axially projecting cam 71. Cam 71 is arcuately positioned relative to the switch actuator arm 54 so that following a depression of the plunger 57, in response to movement of the switch actuator arm 54 and switch lever 55, the cam 71 contacts and pivots a Geneva gear type lever arm 72, pivotally mounted on one end of a shaft 73 journaled in bracket 19, as shown in FIGURES 1 and 2.

Mounted at the other end of the shaft 73 is a pawl 75 formed of thin resilient metal. Pawl 75 is positioned so as to engage ratchet wheel 26 to stop rotation thereof with respect to the input drum 5 only after switch 58 has been actuated by switch actuator arm 54. Referring to FIGURE 2, it will be seen that rotation of ratchet wheel 26, when the clutch is engaged, is in a counterclockwise direction. Also, clockwise rotation of wheel 26 relative to drum 5 tends to radially expand the spring 23 and release its engagement with drum 5. Accordingly, when pawl 75 holds end 24 of the clutch spring 23 stationary, the spring releases its grip on drum 5 so that drum 5 continues to rotate without causing rotation of output drum 6. Thus, switch 58 can remain actuated without de-energizing the motor.

Operation of the timer is initiated by closing switch 80 to energize the synchronous electric motor A. This actuates solenoid 35, permitting the clutch assembly B to be engaged. Control knob 64 should be previously adjusted to provide a predetermined time interval. Plunger 36 of the solenoid 35 is in its retracted position so that arms 40 and 41 are disengaged from the ratchet wheels 26, 27 to permit the spring 23 to rotate in gripping engagement with clutch drums 5 and 6. Clutch output pinion 17 turns the timing gear 50 and switch actuator arm 54 through a predetermined arc, the arc having been determined by the setting of the control knob 64. The completion of the cycle following the predetermined time interval occurs when the switch actuator arm 54 engages switch lever 55 to depress plunger 57 and actuate switch 58. Following the engagement of switch lever 55 by the switch actuator arm 54, the projection or cam 71 of arm 70 engages lever arm 72 to rotate shaft 73. Pawl 75 is rotated into engagement with the teeth of ratchet wheel 26 to prevent further roation of the wheel 26. Input drum 5 now rotates freely within clutch spring 23, although the spring 23 still engages and grips the output drum 6. Thus, the pawl 75 serves to hold the timing and reset mechanism C in a fixed position with the switch 58 actuated. This prevents resetting of the timing and reset mechanism C even though the spiral spring 60 has been wound and exerts a force tending to reverse the timing gear 50 and clutch output pinion 17. The timer will remain in this condition until the switch 80 is opened and the solenoid plunger 36 and U-formed bracket 37 are forced upwardly by spring 39, causing arms 40 and 41 to engage and rotate wheels 26 and 27 to release the clutch spring from both drums 5 and 6.

It will be noted that with this arrangement, the time setting may be readjusted at any time during the timing cycle since during adjustment, the output drum 6 would merely slip and overrun within the clutch spring 23 if time setting is decreased.

While the invention has been described with reference to a specific embodiment thereof, this is intended for the purpose of illustration rather than limitation and other variations and modifications will occur upon a reading of the specification, all of which are within the intended spirit and scope of the appended claims.

Having thus described my invention, I claim:

1. A clutch mechanism comprising:
    a driven member;
    a driving member for driving said driven member in a given direction about a common axis of rotation;
    a coiled spring having opposite end portions wrapped about facing end portions of said members and resiliently biased to firmly grip said members during rotation in said given direction to transmit rotational forces from said driving member to said driven member;
    clutch release means for, upon actuation, preventing rotation of the driving end portion of said spring in said given direction and thereby unwind said driving end portion of said spring so that rotation forces are not transmitted from said driving member to said driven member; and
    actuating means for actuating said clutch release means and including:
        a stop engaging member coupled to and rotationally driven about its axis of rotation by said driven member; and,
        a movably mounted stop having a portion thereof located in the path of rotational movement of said stop engaging member to be engaged and moved thereby, said stop being coupled to said clutch release means for actuating same.

2. A clutch mechanism as set forth in claim 1, wherein said clutch release means includes:
    a ratchet wheel coaxially surrounding and secured to the driving end portion of said spring so as to be carried for rotation in said given direction about said axis of rotation, said wheel having a plurality of radially extending teeth;
    a pawl coupled to said stop for movement therewith to engage said ratchet wheel teeth to prevent rotation thereof in said given direction.

3. A clutch mechanism as set forth in claim 2, wherein said pawl and said stop are mounted for pivotal movement about a common axis.

4. A clutch mechanism as set forth in claim 1, including reset means for resetting said driven member to its original position following actuation of said clutch release means.

5. A clutch mechanism as set forth in claim 4, wherein said reset means includes:
    a reset spring coupled to said driven member in such a manner as to increasingly resiliently bias said driven member to its reset position as said driven member rotates in said given direction.

6. A clutch mechanism as set forth in claim 5, including means for radially expanding said coiled spring so that said coiled spring does not firmly grip either said driving or driven members, permitting said reset spring to resiliently drive said driven member in a direction opposed to said given direction to its original position.

7. A clutch mechanism as set forth in claim 6, including an actuatable switch and a switch actuator, said switch actuator being coupled to and rotationally driven about its axis of rotation by said driven member for actuating said switch upon a predetermined angular rotation of said driven member in said given direction.

8. A clutch mechanism as set forth in claim 7, wherein said stop engaging member is located with respect to said switch actuator so that it engages said stop to actuate said clutch release mechanism at a point in time following actuation of said switch by said switch actuator, whereby said switch actuator may continue to actuate said switch while said driving member continues to rotate in said given direction without driving said driven member.

9. In combination, a clutch comprising an input drum and an output drum, both having a common axis of rotation, a coil spring concentrically disposed around said drums and biased to gripping engagement therewith, and means for radially expanding said coil spring to release said clutch; and a timing and reset mechanism operatively connected to said output drum and having an initial condition, said mechanism comprising a switch actuator adapted to actuate a switch after a predetermined time interval of clutch engagement, means for reversing said mechanism to its initial position following said predetermined time interval, and an input drum release means operable following actuation of said switch actuator to stop rotation of the end of said coil spring adjacent said input drum and radially expand the portion of said coil spring disposed around said input drum to allow free rotation of said input drum while said coil spring and said output drum are held stationary, whereby said switch actuator continues to actuate said switch and said means for reversing said timing and reset mechanism will not operate until said clutch is fully released.

10. A combination as defined in claim 9, wherein said means for radially expanding said coil spring includes means for simultaneously turning the ends of said coil spring in opposite directions in a manner tending to unwind said spring.

11. A combination as defined in claim 10, wherein said means for turning the ends of said coil spring includes a pair of ratchet wheels rotatably mounted on said spring, each said wheel connected to one end of said spring, and a reciprocable member having means for engaging and rotating said wheels in opposite directions in response to movement of said reciprocable member, and means for reciprocating said reciprocable member.

12. A combination as defined in claim 11, wherein said means for reciprocating said reciprocable member includes a solenoid.

13. A combination as defined in claim 9, wherein said timing and reset mechanism includes a rotatable member driven by said output drum and which carries said switch actuator; and, wherein said input drum release means includes a cam member driven by said output drum, a pivotal stop adapted to be pivoted by said cam member, a pivotable shaft supporting said stop, and pawl means carried by said pivotable shaft for contacting a portion of said clutch to stop rotation of the end of said coil spring adjacent said input drum.

14. A combination as defined in claim 13, including a ratchet wheel connected to the end of said coil spring adjacent said input drum and wherein said pawl means for contacting a portion of said clutch comprises a pawl carried by said pivotable shaft and adapted to engage said ratchet wheel in response to movement of said stop.

15. A combination as defined in claim 9, wherein said timing and reset mechanism includes a manually operable control for varying said predetermined time interval.

References Cited
UNITED STATES PATENTS

| | | | |
|---|---|---|---|
| 2,999,949 | 9/1961 | Thompson | 307—141.4 |
| 3,248,575 | 4/1966 | Bowman | 307—141.4 |
| 3,292,017 | 12/1966 | Bauer | 307—141.4 |

DONLEY J. STOCKING, *Primary Examiner.*

ARTHUR T. McKEON, *Examiner.*